June 28, 1966
C. E. GATES
3,257,910
WINDSHIELD WIPER AIR MOTOR
Filed June 19, 1964
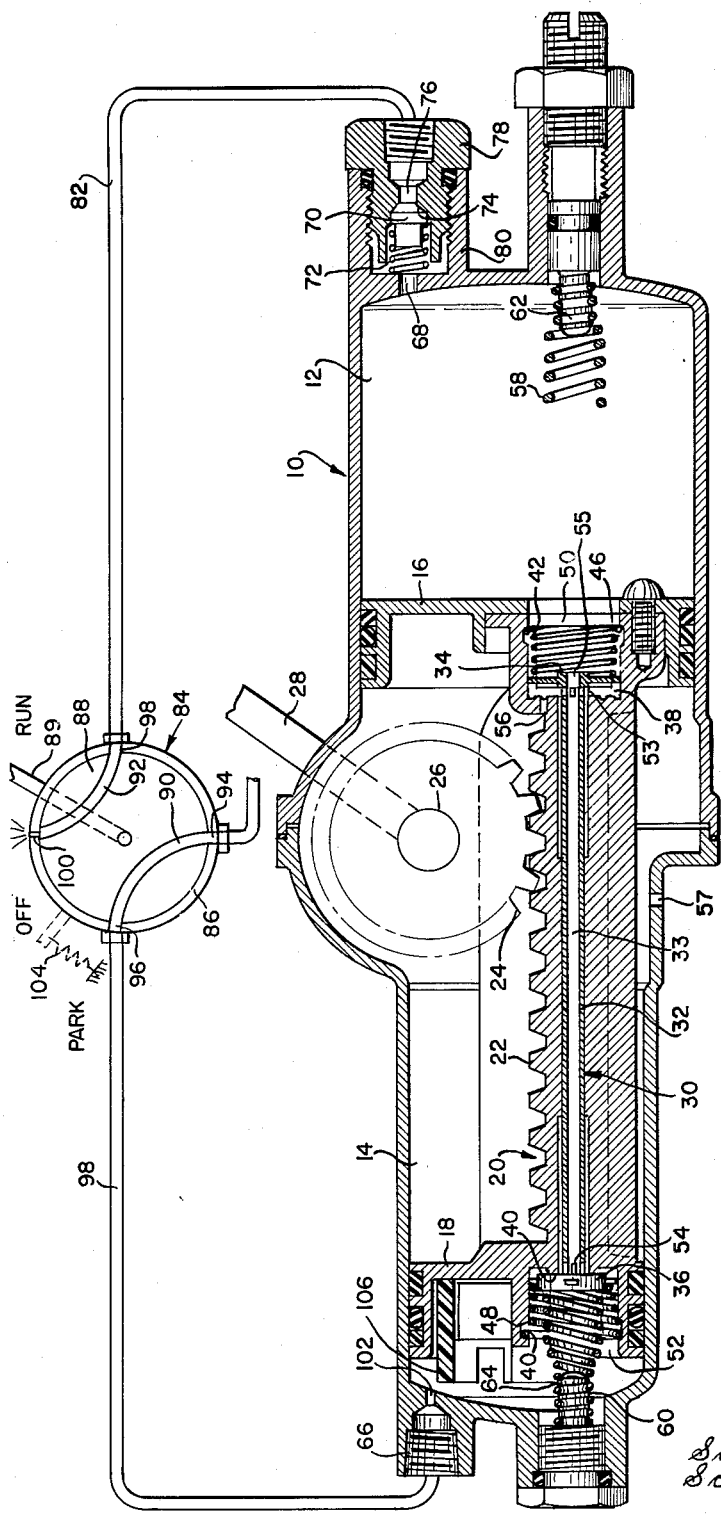
INVENTOR
CHARLES E. GATES
Scrivener, Parker,
Scrivener & Clarke
ATTORNEYS

United States Patent Office

3,257,910
Patented June 28, 1966

3,257,910
WINDSHIELD WIPER AIR MOTOR
Charles E. Gates, Elyria, Ohio, assignor to Bendix-Westinghouse Automotive Air Brake Company, Elyria, Ohio, a corporation of Delaware
Filed June 19, 1964, Ser. No. 376,355
4 Claims. (Cl. 91—7)

This invention relates to windshield wipers and more particularly to windshield wiper motors operated by super-atmospheric pressure.

The broad object of the invention is to provide an improved fluid pressure operated windshield wiper motor which includes improved parking means.

Other objects and their attendant advantages will become apparent as the following detailed description is read in conjunction with the accompanying drawings wherein the single figure is a cross-sectional view embodying the features of the invention, the motor being shown in conjunction with a substantially schematically shown fluid pressure control system.

The windshield wiper motor shown comprises a casing 10 having opposed large and small cylindrical pressure chambers 12, 14, respectively receiving piston members 16, 18 which are rigidly interconnected by means of a shaft 20 having rack teeth 22 on one side thereof engageable with a rack pinion 24 having a central stem 26 which extends outwardly of the casing 10 to receive the inner end of a windshield wiper blade support arm 28.

The shaft 20 contains a bore 30 slidably receiving a plunger 32 which is somewhat longer than the bore. The plunger contains an axial passage 33 and is in abutting engagement at its opposite ends with respective check valves 34, 36 which are urged in the direction of their respective seats 38, 40 by springs 42, 44 whose outer ends engage annular grooves 46, 48 within the valve cavities 50, 52 in the respective pistons 16, 18. When the respective valves are opened, the spaces radially beyond their seats are communicated with the passages 33 by way of slots 53, 54.

The right hand valve 34 contains a central opening 55 which communicates the passage 33 in the plunger 32 at all times with the chamber 12. The valve 34 therefor does not serve to control the passage 33 but rather serves to control an exhaust port 56 which, when the valve is in the open position of the drawing, serves to communicate the chamber 12 with atmosphere through suitable exits 57 in the casing between the cylindrical chambers 12, 14. When the valve 34 is moved to the left in the drawing it closes the exhaust port 56 and the plunger 32, being longer than the passage 30, serves to move the left hand valve 36 from its seat 40.

As so far described, the motor is similar to conventional motors and includes valve shifter springs 58, 60 which are respectively received on suitable respective adjustable and fixed supports 62, 64 so that the springs extend into the chambers 12, 14 in axial alignment with the valve members 34, 36. As the interconnected pistons near one end of a stroke the open valve at that end impinges on the shifter spring and is moved from its open to its closed position to effect reversal of movement of the piston members.

The left hand end of the casing 10 has an inlet port 66 which when fluid pressure is admitted thereto (assuming the left hand valve 36 is in its closed position as shown in the drawing) operates on the small piston 18 to effect movement of the piston to the right. With the left valve 36 closed, the right hand valve 34 is open so that the right hand chamber 12 is connected to atmosphere through exhaust port 56 and atmospheric port 57 and the piston members are substantially unimpeded in their movement to the right. As the members approach the end of their stroke, the valve member 34 impinges on shifter spring 58 so that the valve 34 is moved to close the exhaust port 56 and at the same time the left hand valve 36 is moved to its open position thereby communicating the inlet port 66 by way of passage 33 and opening 55 with the right hand chamber 12 which, desirably, has twice the cross-sectional area of the left hand chamber so that the fluid pressure acting on piston 16 serves to move the piston members to the left with the same force and hence the same speed until the left hand valve member 36 engages its shifter spring 60 which effects closing of the valve 36 and consequent opening of the exhaust port 56 so that the cycle is repeated. Obviously as the piston members reciprocate back and forth the rack 22 operates on the pinion 24 to effect oscillatory wiping movement of the wiper arm 28.

As well known in the art, windshield wiper blades when not in use should be parked in a position which does not interfere with the vision of the vehicle operator. In accordance with the invention, this is achieved in a novel manner by the provision of a parking port 68 leading into the large chamber 12 at the right hand end of the casing. The port 68 is controlled by a one-way check valve 70 which is urged by a spring 72 against a valve seat 74 communicating with an inlet port 76 in a cap member 78 which is threadedly received in a hollow extension 80 surrounding the parking port 68 and integral with the casing 10. Connected to the inlet port 76 is a parking conduit 82 connected to a wiper control valve which may be of the type schematically shown at 84.

As indicated, the valve 84 may include a casing 86 rotatably receiving a core 88 operable by a handle 89 and having a pair of arcuate fluid passages 90, 92. With the handle in the solid-line "Run" position of the drawing, the passage 90 serves to interconnect a supply port 94, leading to a source of super atmospheric fluid pressure (not shown), with an outlet port 96 connected by way of a conduit 98 with the inlet port 66 of the motor. The other fluid passage 92 of the valve 84 serves to connect a parking port 98 in the valve casing with an exhaust port 100 so that the parking conduit leading to the port 76 is connected with atmosphere during normal operation of the windshield wiper.

When it is desired to park the motor of the invention the handle 89 is moved from the solid line "Run" position counter-clockwise against the force of a spring 104 to its "Park" position whereupon the fluid passage 90 of the control valve connects the supply port 94, and hence the source of fluid pressure, to the parking port 98 and conduit 82. At the same time the fluid passage 92 of the valve connects the left hand of the motor to atmosphere by way of the inlet port 66, conduit 98, outlet port 96 and exhaust port 100. With the parking conduit connected to the source of fluid pressure, pressure fluid is now admitted to the inlet port 76 of the cap member 78 to operate against the check valve 70 to unseat the same and admit fluid pressure to the chamber 12 where it operates on the piston 16 to move the elements to the left in the drawing until the wiper arm has moved to its parked position. A rubber bumper 106 is fixed to the piston 18 to absorb the impact load of the piston 16 when parking. At this juncture the operator merely releases the handle 89 whereupon the spring 104 automatically returns the handle to the intermediate "Off" position wherein the fluid passages 90, 92 of the valve are so positioned with respect to the ports through the casing that none of the latter are connected with each other. It has been found that when the motor has been parked as just described, inertia and friction forces are amply sufficient to retain the motor in its parked position.

It should be noted that regardless of whether the right hand shifter valve 34 is in its open or closed position when parking pressure is admitted to the chamber 12, during parking the chamber 12 will at all times be directly connected to atmosphere either through the exhaust port 56 if the valve 34 is open or through the inlet port 66 and the exhaust port 100 of the control valve 84 in the event the valve 34 is closed. Irrespective of which of these two ports 56, 100 serves to connect the chamber 12 to atmosphere, in accordance with the invention the motor is readily moved to its parking position by arranging the exhaust ports 56, 100 so that they have less capacity than the parking and inlet ports 68, 76 whereby a sufficiently high pressure differential is sustained during parking in the chamber 12 until the motor has moved to its parking position. Additionally, it is within the purview of the invention to arrange the right hand valve 34 to be pressure responsive to a relatively massive inflow of parking pressure fluid to the chamber 12 so that in the event the piston members have moved only partly towards the right when it is decided to park, when the valve 84 is moved to parking position to admit parking pressure to the chamber 12 this operates directly on the valve 34 to shift it by pressure to its closed position whereupon the chambers 12, 14 are directly connected to atmosphere by way of the exhaust port 100 of the valve 84 which, as mentioned before, is sufficiently restricted to permit build up of parking pressure in the chamber 12 sufficient to park the motor. It will be seen that by insuring that the exhaust port 56 is invariably closed during parking, regardless of the position of the motor at the time parking commences, it is not necessary to have the exhaust port 56 of particularly restricted capacity with respect to the parking and inlet ports 68, 76. On the other hand, in lieu of restricting the exhaust port 100 of the control valve 84 a restricted orifice 102 of less capacity than the parking and inlet ports could be interposed between the inlet port 66 and the smaller chamber 14 as shown in the drawing.

As has been mentioned, the control valve 84 is merely a schematic representation and any of a wide variety of valves could be used to produce the desired result. It will also be apparent to those skilled in the art that the invention is susceptible of a variety of changes and modifications without, however, departing from the scope and spirit of the appended claims.

What is claimed is:

1. In a super atmospheric fluid pressure operated windshield wiper motor of the type having a pair of opposed differential area cylinders and rigidly interconnected pistons slidably received in said cylinders, inlet port means leading to the smaller cylinder and adapted to be alternatively connected to atmosphere or to a source of operating pressure, shiftable valve means carried by each of said pistons for connecting and disconnecting the larger of said cylinders with the smaller thereof, an exhaust port controlled by the valve means of the larger of said pistons, the invention which comprises parking port means including a first port leading into the larger of said cylinders, a second port communicating with said first port, means for connecting said second port with said source while simultaneously connecting said inlet port means with atmosphere, and check valve means interposed between said first and second ports and arranged to permit the flow of parking pressure from said second to said first port and thence to said large cylinder but not in the reverse direction, the inlet port leading to the smaller cylinder having less capacity than the parking port means leading to the larger cylinder.

2. In a differential area type fluid pressure operated windshield wiper motor having a small cylinder and piston at one end, a large cylinder and piston at the other end and an inlet port at the small end adpated to be connected to a source of operating pressure or to atmosphere, the invention which comprises a parking port connected to the larger cylinder and adapted to be connected to said source of pressure to admit pressure to said larger piston and move said motor to parking position when said inlet port is connected to atmosphere, and a one way check valve connected to said parking port to permit the flow of pressure into said large cylinder but not in the reverse direction, exhaust port means connected to said motor, and means communicating said larger cylinder with said exhaust port means, the capacity of said exhaust port means being substantially less than the capacity of said parking port.

3. The motor of claim 1 wherein the exhaust port has less capacity than the parking port means.

4. The motor of claim 2 wherein the flow capacity of said inlet port is less than said parking port.

References Cited by the Examiner
UNITED STATES PATENTS

| | | | |
|---|---|---|---|
| 2,661,726 | 12/1953 | Alfieri | 91—224 |
| 3,005,445 | 10/1961 | Riester | 91—7 |

SAMUEL LEVINE, *Primary Examiner.*

P. T. COBRIN, *Assistant Examiner.*